United States Patent
Samson et al.

(10) Patent No.: US 9,715,024 B2
(45) Date of Patent: Jul. 25, 2017

(54) NEAR-FIELD ELECTROMAGNETIC COMMUNICATIONS NETWORK FOR DOWNHOLE TELEMETRY

(76) Inventors: Etienne M. Samson, Houston, TX (US); Paul F. Rodney, Spring, TX (US)

(*) Notice: Subject to any disclaimer, the term of this patent is extended or adjusted under 35 U.S.C. 154(b) by 239 days.

(21) Appl. No.: 13/387,843

(22) PCT Filed: Aug. 11, 2009

(86) PCT No.: PCT/US2009/053492
§ 371 (c)(1),
(2), (4) Date: Jan. 30, 2012

(87) PCT Pub. No.: WO2011/019340
PCT Pub. Date: Feb. 17, 2011

(65) Prior Publication Data
US 2012/0126993 A1 May 24, 2012

(51) Int. Cl.
*G01V 3/00* (2006.01)
*G01V 1/00* (2006.01)

(52) U.S. Cl.
CPC .................. *G01V 1/003* (2013.01)

(58) Field of Classification Search
CPC ............................................... G01V 3/18
USPC .................. 340/853.1, 854.3, 854.8
See application file for complete search history.

(56) References Cited

U.S. PATENT DOCUMENTS

| | | | |
|---|---|---|---|
| 4,785,247 A | 11/1988 | Meador et al. | |
| 7,228,902 B2 | 6/2007 | Oppelt | |
| 7,400,262 B2 | 7/2008 | Chemali et al. | |
| 2004/0231841 A1* | 11/2004 | Niemeyer et al. | 166/264 |
| 2005/0207279 A1* | 9/2005 | Chemali et al. | 367/83 |
| 2005/0230110 A1* | 10/2005 | Ellison | E21B 17/006 166/255.1 |
| 2007/0023185 A1* | 2/2007 | Hall | E21B 17/028 166/255.1 |
| 2007/0278008 A1* | 12/2007 | Kuckes et al. | 175/40 |

(Continued)

OTHER PUBLICATIONS

Thomson Reuters, RuBee, High-Security, Harsh-Environment RFID Alternative, Feb. 11, 2009, Retrieved from the internet, pp. 1-2.*

(Continued)

*Primary Examiner* — Amine Benlagsir
(74) *Attorney, Agent, or Firm* — Iselin Law PLLC; Alan Bryson

(57) ABSTRACT

A disclosed downhole telemetry system employs an array of near-field electromagnetic communication devices to relay information along a tubular in a borehole. In some embodiments, the devices are permanently attached to pipe joints without requiring any structural modification of the pipe joints. As the pipe joints are strung together in the normal fashion to form a tubular, the devices automatically establish a wireless communications path between an uphole terminus device and any downhole sensors or tools. The devices can include built-in sensors to provide distributed sensing of parameters such as temperature and pressure. In some embodiments the device array incorporates redundancy to minimize the chance of a communications network failure. The device array has applications for logging-while-drilling, production testing, well completion, reservoir monitoring, and well control.

20 Claims, 4 Drawing Sheets

(56) References Cited

U.S. PATENT DOCUMENTS

| | | | |
|---|---|---|---|
| 2008/0030365 A1* | 2/2008 | Fripp | E21B 47/16 340/853.1 |
| 2009/0289808 A1* | 11/2009 | Prammer | 340/853.7 |
| 2010/0133006 A1* | 6/2010 | Shakra | E21B 47/12 175/24 |

OTHER PUBLICATIONS

Angelidis, Diogenes et al., "Optical Micromachined Pressure Sensor for Aerospace Applications", Optical Engineering, vol. 31, No. 8, (Aug. 1992), pp. 1636-1642.

Aratani, K. "Process and Design Considerations for Surface Micromachined Beams for a Tuneable Interferometer Array in Silicon", IEEE Xplore, IEEE, 1993, pp. 230-235.

Burns, D. W., et al., "Thin Films for Micromechanical Sensors", J. Vac. Sci. Technol. A 8(4), American Vacuum Society, (Jul. 1990),pp. 3606-3613.

IEEE, "IEEE Standard for Long Wavelength Wireless Network Protocol", IEEE Std 1902.1, New York, NY, (Mar. 31, 2009), 35 pgs.

Johnson, R. L., et al., "Miniature Instrument for the Measurement of Gap Thickness Using Poly-Chromatic Interferometry", Center for Astronomical Adaptive Optics, Steward Observatory, The University of Arizona, Tucson, AZ, (Unknown), 9 pgs.

Li, Weizhuo et al., "Wavelength Multiplexing of Microelectromechanical System Pressure and Temperature Sensors Using Fiber Bragg Gratings and Arrayed Waveguide Gratings", Opt. Eng. Society of Photo-Optical Instrumentation Engineers, 0091-3286/2003,, (Feb. 2003), pp. 431-438.

MacDougall, Trevor W., et al., "Large Diameter Waveguide Bragg Grating Components and Their Application in Downhole Oil & Gas Sensing", Weatherford International, Wallingford, CT, (Unknown),12 pgs.

Pitcher, R. J., et al., "Optothermal Drive of Silicon Resonators: The Influence of Surface Coatings", Sensors and Actuators, A21-23, (1990), pp. 387-390.

Putty, Michael W., et al., "Process Integration for Active Polysilicon Resonant Microstructures", Sensors and Actuators, 20, (1989), pp. 143-151.

Tseng, Fan-Gang et al., "Polymer MEMS-Based Fabry-Perot Shear Stress Sensor", IEEE Sensors Journal, vol. 3, No. 6, (Dec. 2003), pp. 812-817.

Tudor, M.J. et al., "Silicon Resonator Sensors: Interrogation Techniques and Characteristics", IEE Proceedings, vol. 135, Pt. D, No. 5, (Sep. 1988), pp. 364-368.

Unknown, "Optical Activation of a Silicon Vibrating Sensor", Electronic Letters, vol. 22, No. 21, (Oct. 9, 1986), pp. 1097-1099.

Graber, Karen K., et al., "Drill String Tool Sheei", Overview of Ocean Drilling Program, http://www.odp.tamu.edu/publications/tnotes/tn31/drill_s/drill_s.htm> (retrieved Sep. 21, 2009), (Jul. 2004), 3 pgs.

PCT International Search Report and Written Opinion, dated Sep. 29, 2009, Appl No. PCT/US2009/053492, A Near-Field Electromagnetic Communications Network for Downhole Telemetry, filed Aug. 11, 2009, 7 pgs.

PCT International Preliminary Report on Patentability, dated Oct. 21, 2011, Appl No. PCT/US2009/053492, A Near-Field Electromagnetic Communications Network for Downhole Telemetry, filed Aug. 11, 2009, 16 pgs.

* cited by examiner

NEAR-FIELD ELECTROMAGNETIC COMMUNICATIONS NETWORK FOR DOWNHOLE TELEMETRY

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," was originally performed using wireline logging.

In wireline logging, an operator lowers a probe or "sonde" into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, the sonde measures various parameters of the earth's formations and correlates them with the sonde's position as the operator pulls it uphole.

Although it is often useful, wireline logging does have its limitations. If the borehole has been cased, i.e., lined with steel casing that has been cemented in place, then the sensing abilities of most wireline tools are impaired. Typically the operator removes any tubulars in the borehole before performing a wireline logging run, thereby adding cost and delay to the logging process. Moreover, the delay often degrades the logging measurement quality due to migration of fluid from the borehole into the formation or caving and collapse of the borehole walls. Wall caving can potentially also trap the logging tool downhole.

Consequently, engineers have created other logging methods such as logging while drilling ("LWD"), and tubing conveyed logging. Such methods are unable to feasibly employ a logging cable because (if unprotected), the cable quickly gets pinched between the tubing and the borehole wall and sheared or shorted out. (Operators generally dislike employing cable protection measures because they require additional effort and they often fail anyway.) Thus engineers have created various alternative telemetry methods to communicate information between downhole tools and the surface. Such methods include mud pulse telemetry, acoustic telemetry, and very low-frequency electromagnetic telemetry. These methods demonstrate a limited range and/or a slow data rate. Recent development efforts have focused on tubing with integrated wiring, but the anticipated costs for such tubing remains prohibitively high due to the requirement for custom coupling designs.

BRIEF DESCRIPTION OF THE DRAWINGS

A better understanding of the various disclosed embodiments can be obtained when the following detailed description is considered in conjunction with the attached drawings, in which.

Figure 1:
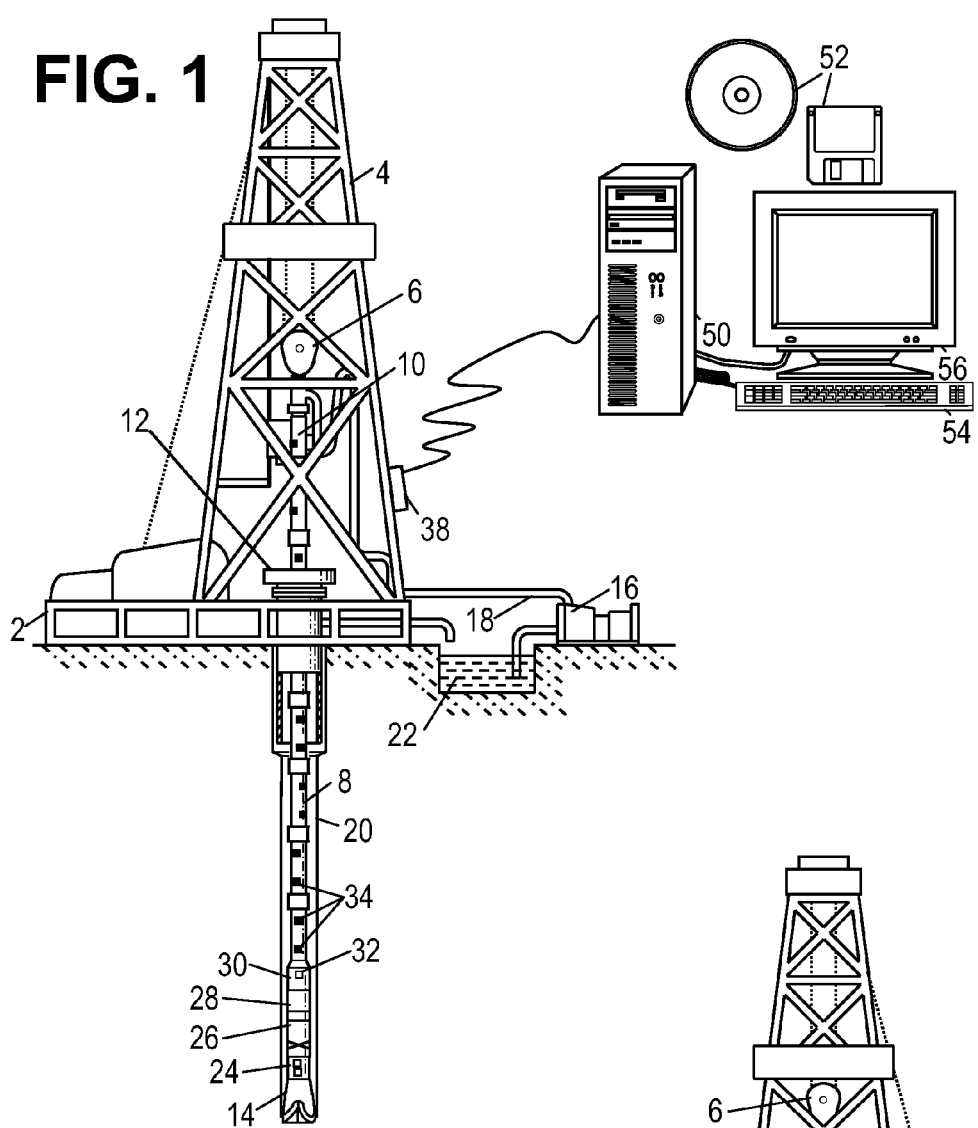
FIG. 1 shows an illustrative logging while drilling (LWD) environment.

While the invention is susceptible to various modifications and alternative forms, specific embodiments thereof are shown by way of example in the drawings and will herein be described in detail. It should be understood, however, that the drawings and detailed description thereto are not intended to be limiting, but on the contrary, the intention is to cover all modifications, equivalents and alternatives falling within the scope of the appended claims.

DETAILED DESCRIPTION

At least some of the downhole telemetry devices, systems, and methods disclosed herein provide an array of near-field electromagnetic communication devices to relay information along a tubular in a borehole. In some embodiments, the devices are permanently attached to pipe joints without requiring any structural modification of the pipe joints. In other embodiments, the devices are removable temporary installations that enable easy replacement and reconfiguration of existing arrays. As the pipe joints are strung together in the normal fashion to form a tubular, the devices automatically establish a wireless communications path between an uphole terminus device and any downhole sensors or tools. The devices can include built-in sensors to provide distributed sensing of parameters such as temperature and pressure. In some embodiments the device array incorporates redundancy to minimize the chance of a communications network failure. The device array has applications for logging-while-drilling, production testing, well completion, reservoir monitoring, and well control.

The disclosed devices, systems, and methods are best understood in the context of the larger systems in which they operate. Accordingly, FIG. 1 shows an illustrative logging-while-drilling ("LWD") environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 20 that passes through various formations. A pump 16 circulates drilling fluid 22 through a feed pipe 18, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly that includes one or more drill collars (thickwalled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes can alternatively be used. The orientation measurements can be combined with gyroscopic or inertial measurements to accurately track tool position.

The illustrated bottom-hole assembly includes logging tools 24 and 26 coupled to a downhole control module 28. As the bit 14 extends the borehole 20 through the formations, the logging tools 24, 26 rotate and collect measurements that the downhole controller 28 associates with tool position and orientation measurements. The measurements can be stored in internal memory and/or communicated to the surface. A telemetry sub 30 includes a downhole terminus device 32 that communicates with a uphole terminus device 38 via an array of near-field electromagnetic communication devices 34. At the surface, the uphole terminus device 38 acts as an interface between the telemetry array and a data processing system 50. The data processing system 50 (shown in FIG. 1 as a computer) receives a telemetry data stream, processes it, and displays the tool data or well logs to a user. The data processing system 50 can further transmit commands and configuration information to the downhole terminus device(s) via the telemetry array. Software (represented in FIG. 1 as information storage media 52) governs the operation of system 50. A user interacts with system 50 and its software 52 via one or more input devices 54 and one or more output devices 56.

Figure 2:
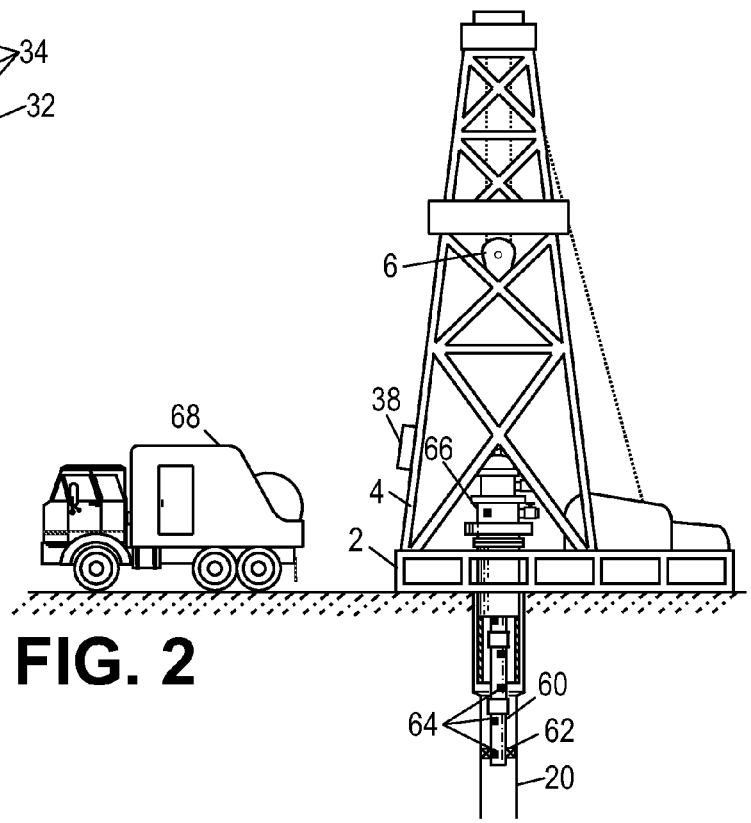
FIG. 2 shows an illustrative production testing environment.

When the drilling has been completed, the operators trip the drill string 8 out of the borehole. The drill string (optionally without the bit and bottomhole assembly), a casing string, or a production tubing string 60 can be lowered into the borehole 20 as shown in FIG. 2 to perform pressure testing. The operator uses one or more packers 62 to isolate a section of the borehole 20, and then adds or subtracts pressure to that section via a "Christmas tree" assembly 66. (In oilfield parlance, the Christmas tree is an assembly of a blow-out preventer and the various pipes, packers, and valves secured to the well head 12 to provide pressure controlled access to the interior passages and annuli of the well.) The operators measure flow rates, temperature profiles, and/or pressure profiles to characterize the dynamics of the formation and predict the potential productivity of the well. The uphole terminus device 38 collects data from the array of near-field electromagnetic communication devices 64 positioned around the well site and downhole, and provides the measurement data to a logging truck 68 (or other data collection facility) via a conventional wired or wireless connection. The uphole terminus device can be mounted above-ground near the well head, or alternatively incorporated into the tubing string as an interface sub. As another embodiment, the taphole terminus device can be mounted in the borehole (e.g., at the foot of the casing) and connected to the surface by a cable.

Figure 3:
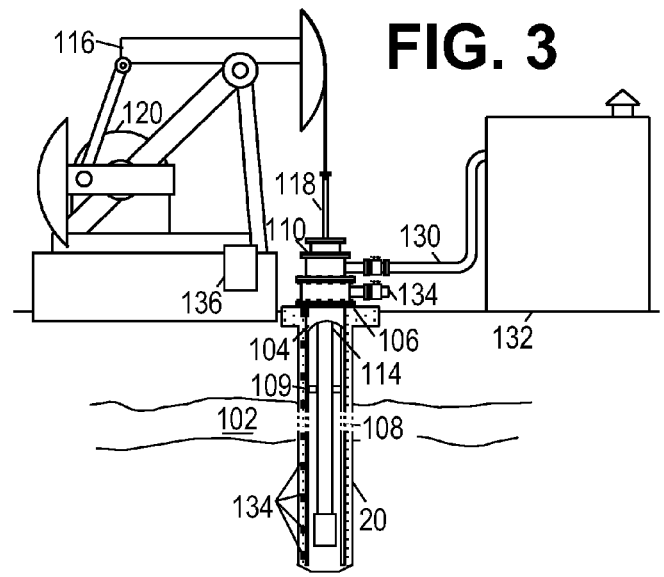
FIG. 3 shows an illustrative well control and formation monitoring environment.

FIG. 3 shows an illustrative well during production. Borehole 20 has been drilled through the earth to intersect a fluid reservoir 102. The borehole is generally lined with casing 104 that extends from the well head 106 to below the fluid reservoir 102. The casing 104 is perforated 108 where it intersects the reservoir to allow fluid to flow into the interior of casing 104. A Christmas tree assembly 110 is attached to the well head 106 for controlling fluid and gas flows from the well. One or more production tubing strings 114 may be placed within the casing to transport fluids and gasses to the surface. A packer 109 may be provided in the annulus between the production tubing 114 and the casing 104 to isolate different regions within the well. Various valves may be provided to regulate the flow into the production tubing from different regions of the well.

Often, fluid pressure in the formation will be sufficient to force the fluid to the surface via the production tubing 114. On the other hand, artificial lift is often employed when such fluid pressure is insufficient. The well of FIG. 3 includes a "walking beam" pump 116 for artificial lift. In the embodiment shown, a motor 120 drives the beam to vertically reciprocate pump rod 118, thereby driving a piston in a pump barrel attached to the end of the tubing 114 and anchored downhole using standard well servicing techniques. When the pump body is submerged in fluid, the piston's motion forces the fluid to pass through a set of check valves and travel upward through the tubing string 114 to the surface. Surface outflow from the production tubing string 114 is conveyed via a fixed outflow passage 130 to an above-ground storage tank 132.

An array of near-field electromagnetic communication devices 134 attaches to the exterior of casing 104 and establishes a communication pathway to an uphole terminus device 136 using techniques described herein below. In alternative embodiments, the array attaches to the production tubing 114. Various ones of the devices 134 can include sensing mechanisms for measuring properties of the formations or the well, and can further or alternatively include control mechanisms for adjusting the configuration of the well. The sensing mechanisms can measure cement temperature, density, stress, strain, deformation, or related properties of the casing or tubing. Measurable fluid flow properties include temperature, pressure, composition, density, velocity, phase, viscosity, and flow regime. Alternatively, formation properties can be measured such as density, resistivity, fluid interface position, pressure, temperature, and flow rate. The array of devices 134 can also serve as a seismic sensing array. The control mechanisms can include isolation devices, flow regulators, and artificial lift mechanisms, any of which can be adjusted in response to parameter measurements to optimize the well's productivity.

Though drilling, testing and production have been specifically described above, other contexts for the use of downhole telemetry also exist. For example, fluid injection, formation fracturing, seismic mapping, and long term monitoring are also appropriate contexts for the use of downhole electronics. In each case, the near-field electromagnetic communication devices can be temporarily or permanently attached to components of a tubular and configured to automatically establish a communications pathway along the tubular on demand.

Figure 4:
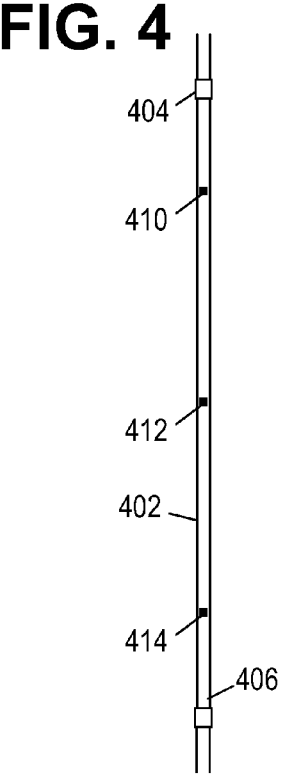
FIG. 4 shows a first illustrative arrangement of near-field communication devices.

FIG. 4 shows a portion of a tubing string having a first illustrative arrangement of near-field electromagnetic communication device. A tubing joint 402 has a female "box" end 404 and a male "pin" end 406, each of which are threaded to connect to the appropriate ends of other tubing joints. The near-field electromagnetic communication devices which have been attached to the tubing joint are arranged so as to provide an even spacing between devices along the tubing string. Thus in the example of FIG. 4, three devices 410, 412, 414 are attached to each joint 402 and spaced apart by 0.33 times the length of a joint. It is expected that the system will be very tolerant of spacing variations, so rigid enforcement of the spacing requirements should not be necessary.

In some embodiments, the spacing between devices is chosen to be between 40% and 50% of the devices' nominal communications range, so as to provide some degree of redundancy. If any one device fails, its neighboring devices can still communicate with each other. In other embodiments, the spacing between devices is chosen to be roughly 30% of the communication range to enable continued communications even if two neighboring devices should fail. Moreover, it is not necessary to require even spacing. In some embodiments, the devices can be installed in closely-spaced pairs or triplets, each pair or triplet separated from the next pair or triplet by more than 50% of the communications range.

In some contemplated implementations, excessive signal loss is anticipated (at least intermittently) at the connections between tubing joints. In such implementations, devices can be placed proximate to the box and pin of each joint to ensure maximum signal strength as the devices communication across the connections.

In some specific particular implementations, the near-field electromagnetic communication devices are RuBee devices, i.e., devices that comply with IEEE STD 1902.1™-2009 ("IEEE Standard for Long Wavelength Wireless Network Protocol"), and are optionally augmented with additional features to make them more suitable for downhole use. Thus off-the-shelf communication devices (after having been tested for high-temperature operation and longevity) may be packaged to protect against high pressure and high-vibration environments, potentially equipped with larger batteries or kinetic energy sources, optionally attached to a larger antenna, and fitted to a means for securing and protecting the device. Some re-programming of the device firmware may be employed to provide an efficient communication relay protocol as described further below.

Unlike existing techniques which require contact or close proximity for communication to occur, near-field communication devices can be spaced at least 30 centimeters apart, with more typical communications ranges expected to be 3-5 meters when relying on integrated antennas or 5-10 meters or more when larger antennas (such as a coil enclosing the tubing) are employed. Moreover, it is expected that the performance of such devices will be largely unaffected by the presence of metal and other conductive materials.

Figure 5:
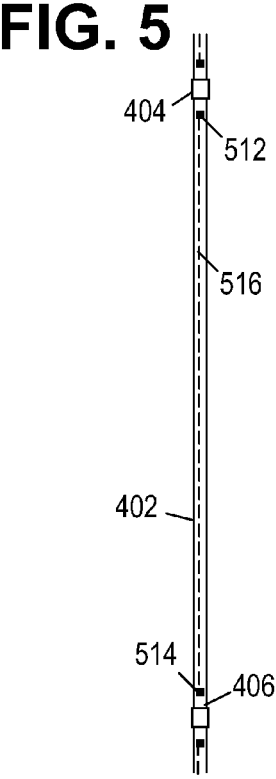
FIG. 5 shows a second illustrative arrangement of near-field communication devices.

FIG. 5 shows an alternative embodiment in which all of the devices 512, 514 coupled to a given tubular joint 402 are wired together via a cable 516. Communication between devices on the same joint 402 is accomplished via the cable 516, while communication between different joints 402 is accomplished using near-field electromagnetic communication. This embodiment enables the techniques disclosed herein to be feasibly employed even when their maximum communications range is less than a third of the length of a tubing joint.

Figure 6:
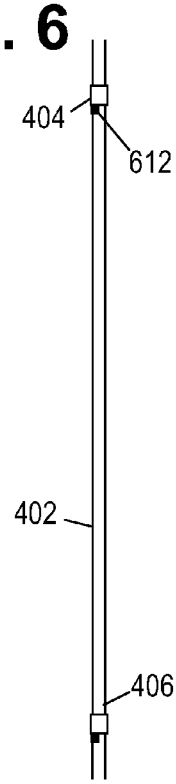
FIG. 6 shows a third illustrative arrangement of near-field communication devices.
Figure 7:
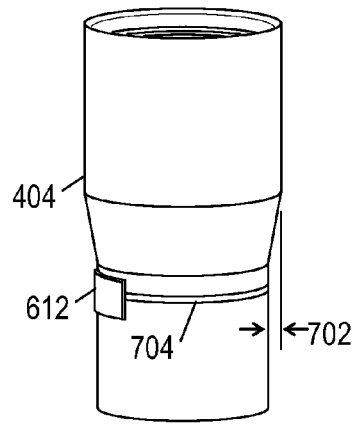
FIG. 7 is a detail view of an illustrative device placement.

When the communications range of each device is greater than the length of a tubing joint, each tubing joint 402 can be provided with a single near-field electromagnetic communications device 612 as shown in FIG. 6. In some embodiments, such devices are preferentially positioned near one of the ends of the joint 404, 406 as shown in FIG. 7. This location exploits the upset 702 of the connectors to protect the device 612 and its antenna 704. So long as the device 612 is positioned in the "shadow" of the upset, the upset protects the device by absorbing most of the collisions and contact with neighboring surfaces. A similar upset exists on the joint's pin end 406 (see, e.g., FIG. 13 as an example).

In at least some embodiments, the antenna 704 is an insulated conductor that the near-field electromagnetic communications device employs to generate a magnetic field in the 30 kHz-450 kHz range. In some alternative embodiments, the antenna 704 is a toroid that the device employs to generate a 30 kHz-450 kHz electric field (assuming non-conductive fluid and tubing) or current (if the tubing or fluid is conductive). In yet other alternative embodiments, the antenna 704 comprises a pair of insulated conductors that the device uses as a dipole antenna. In still other embodiments, the antenna 704 is internal to the device 612. In each of these embodiments, the device (with or without an external antenna) can be embedded in a recess, adhered to the surface with adhesive, and/or secured by a sleeve. In at least some of these variations, the devices are attached to stock tubing without structural modification to the tubing.

Figure 8:
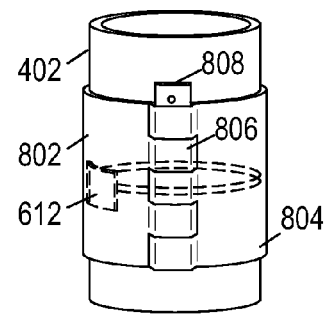
FIG. 8 is a detail view of a first illustrative sleeve protector.

FIG. 8 is a detail view of a first illustrative sleeve protector that can be used to secure and protect a near-field electromagnetic communications device 612. The illustrative sleeve protector has two or more hinged components 802, 804 with fingers that mesh to form a keyway 806. A key 808 is forced into the keyway 806 to close the sleeve protector. Friction holds the key and the protector securely held in place, thereby securing and protecting the device 612. The illustrative protector can comprise aluminum, non-magnetic steel, or some other high-tensile strength, relatively non-magnetic material with moderate crush resistance.

Figure 9:
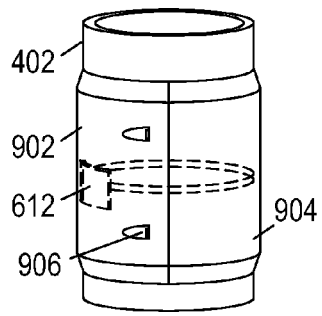
FIG. 9 is a detail view of a second illustrative sleeve protector.

FIG. 9 is a detail view of a second illustrative sleeve protector that can be used to secure and protect device 612. This illustrative sleeve protector has two semi-cylindrical components 902, 904 that can be secured together by threaded connectors such as screws or bolts 906. This second illustrative sleeve protector can be a non-magnetic metal, but in at least some embodiments it comprises a resilient material that primarily acts to cushion impacts and prevent crushing of device 612.

It is noted that the sleeve protector embodiments enable devices 612 to be readily removed and replaced, though it is expected that in many cases such removal or replacement will be infeasible or simply unnecessary. For example, the devices 612 that comply with the IEEE Std 1902.1™ will typically consume very little power and can be expected to have average lifetimes in excess of 10 years when battery powered. (The maximum useful life for drill pipe is in the neighborhood of 10 years.) Devices that are powered by so-called "kinetic batteries" such as those batteries employing battery technology from M2E Power, Inc., 875 W. McGregor Court, Suite 150, Boise, Id. 83705, can be expected to have indefinite lifetimes. In such cases, the devices can be permanently encased or adhered to the tubulars. For example, the sleeve protector can be welded in place, or the device can be encased with a moldable centralizer material (such as the Protech CRB™ material, which is a moldable composite material including carbon-fiber, silicon carbide, titanium nitride, and Novalac resin).

Figure 10:
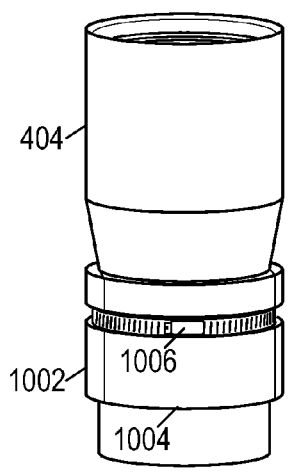
FIG. 10 is a detail view of a first illustrative device package.
Figure 12:
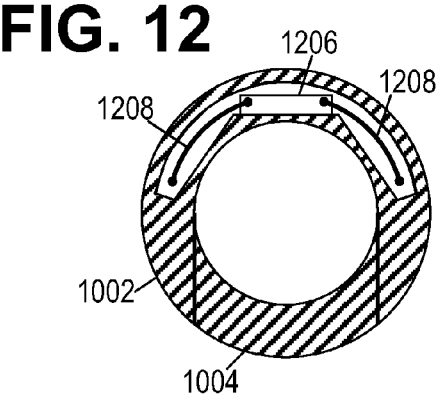
FIG. 12 is a cross-section of an illustrative device package.

FIG. 10 is a detail view of a first illustrative device package having two U-shaped components 1002, 1004 that when held together by a clamp 1006 form a hollow cylinder. A cross-sectional view of the package is shown in FIG. 12. The larger U-shaped component 1002 houses the near-field electromagnetic communications device electronics 1206, as well as conductors 1208 for a dipole antenna or a vertically-oriented wire loop. Component 1002 has an opening large enough to accommodate the tubular joint 402, and component 1004 fills the opening to complete the cylindrical profile. In some embodiments, component 1004 includes an insulated conductor that contacts the ends of conductors 1208 to form an insulated loop around the tubular joint 402. Suitable mechanisms for providing insulated electrical contacts include, e.g., conductive tabs that slide between spring-loaded contacts as component 1004 is fitted in place, with seals that block environmental fluids from reaching the contacts.

Clamp 1006 (FIG. 10) can take the form of a so-called "hose clamp", which is a metal strip having apertures to engage the threads of a screw. As the screw is turned, the strap is tightened in a recess to secure components 1002, 1004 in place. Other techniques can alternatively or additionally be employed, including without limitation: keys, bolts, adhesives, and welds.

Figure 11:
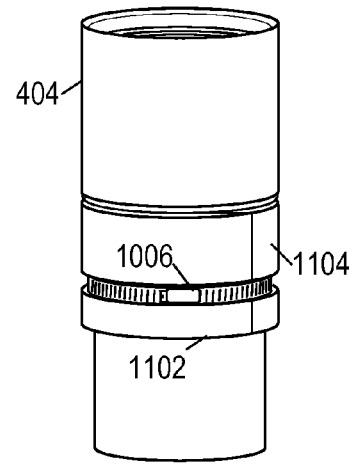
FIG. 11 is a detail view of a second illustrative device package.

FIG. 11 shows a variation of the package in FIG. 10, in which the U-shaped components 1102, 1104 conform to the taper around the base of the box end 404 or pin end 406. This variation may offer increased protection for the device while reducing the distance to a corresponding device on the next joint 402. In both embodiments, the inner surface of the components can be roughened to increase adhesion to the tubular. The package can carry sensors inside or on its outer surface, such as temperature sensors, pressure sensors, mud resistivity sensors, accelerometers, calipers (acoustic or electromagnetic), sensors for specific chemicals, etc.

Figure 13:
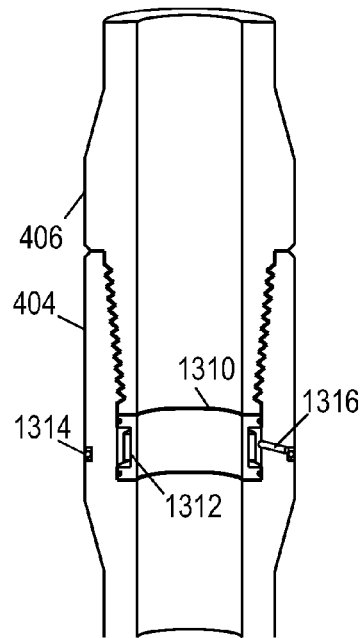
FIG. 13 shows an alternative device package placement.

We note that the placement of the device electronics need not be limited to the exterior of the tubular. For example, FIG. 13 shows an illustrative embodiment in which the device package 1310 is positioned on the interior of the tubing string, Package 1310 is positioned at the base of box 404 and held in place by a fully seated pin end 406. The package has an outer diameter slightly smaller than the inner diameter of the box bore (with O-rings to provide a pressure seal), and an inner diameter matching the inner diameter of the tubular ID of the boreback, and an ID matching the ID of the rest of the drill collar. Device electronics 1312 can be positioned within a sealed annular chamber. The antenna can similarly be positioned within the sealed annular chamber, although in the illustrated embodiment the antenna 1314 is positioned in a recess on the exterior surface of the box end 404. A filler material secures and protects the antenna 1314 in the recess. The electronics 1312 can be connected to the antenna 1314 via a radial passage 1316. As before, antenna 1314 can take the form of a coil, a toroid, or a dipole.

Figure 14:
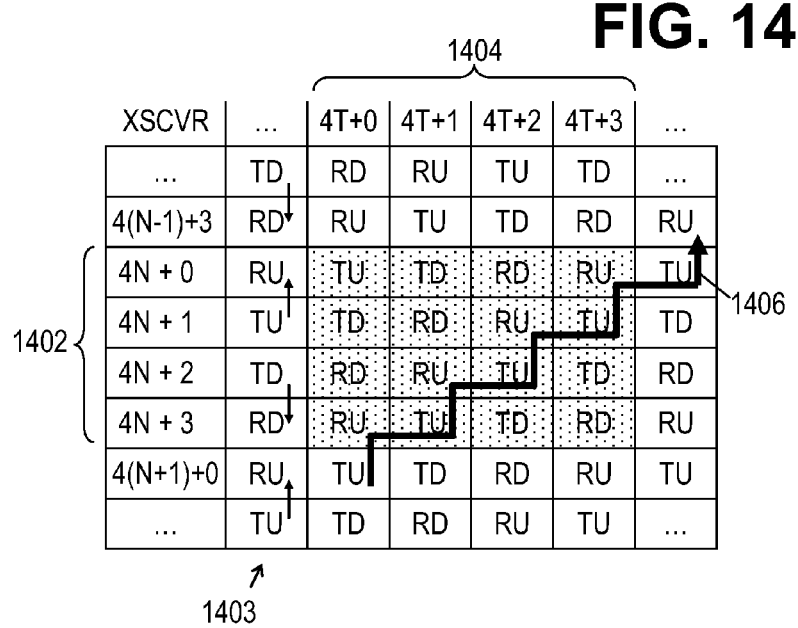
FIG. 14 shows an illustrative bidirectional relay communication strategy.

FIG. 14 illustrates one way in which series of near-field electromagnetic communications devices can operate to provide an efficient bidirectional path. In the table of FIG. 14, the rows correspond to individual devices, which have been numbered in order from the uphole terminus to the downhole terminus, (Note, it is the position in the communications chain that matters, not the physical location on the tubular. As explained further below, the communications chain does not necessarily include all the near-field electromagnetic communications devices attached to the tubular, and even if it does, it does not necessarily include them in their physical order.) The table columns represent sequential communication time slots. Each table cell begins with a "T" or a "R" to indicate whether the receiver represented by that row is transmitting or receiving during that time slot. Each table cell ends with a "D" or a "U" to indicate whether the data being transmitted or received is traveling downward or upward along the chain. The column and row entries are periodic, so this discussion focuses on the activities of the devices represented by rows 1402.

In the time slot represented by column 1403, device 4N±0 is receiving upward-going data from device 4N+1, and device 4N—2 is transmitting downward-going data to device 4N+3. In each successive time slot, the cell entries are shifted upward, so that in the time interval 1404, an upward-going data block progresses as shown by arrow 1406. In each time slot, the upward-going data block progresses an additional step along the chain. Conversely, downward-going data blocks only progress one step for every three time slots. In both cases, the throughput is one block for every four time slots, but the communications latency for upward-going data blocks has been minimized at the expense of increased latency for downward-going data blocks. (It is possible to re-order the operations so that upward-going and downward-going data blocks experience equal latencies of one step for every two time slots on average.)

Thus proper sequencing of operations enables a chain of near-field electromagnetic communication devices to act in the manner of a fire-brigade, passing data blocks instead of buckets up and down the line in an efficient, synchronized manner. When each device has determined its position in the sequence and enters the illustrated series of operations, it is said to have entered the communication cycle.

Figure 15:
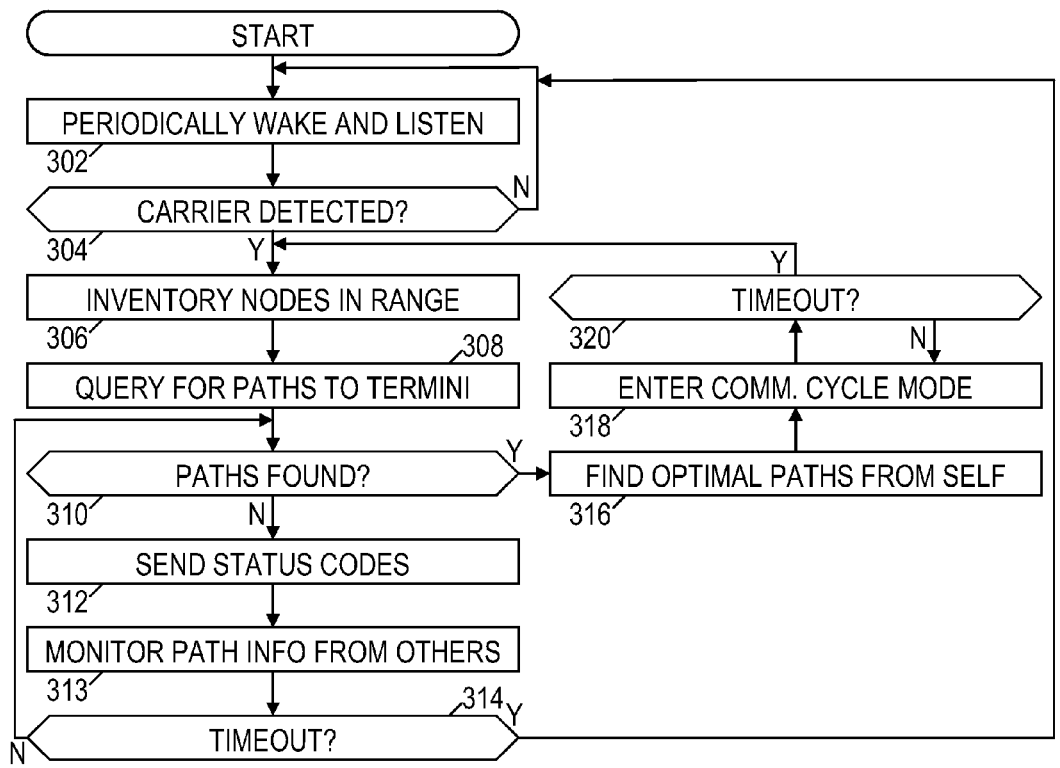
FIG. 15 shows an illustrative telemetry method for each device.

FIG. 15 shows an illustrative telemetry method that, when implemented by each device, establishes the bi-directional communications path in an ad-hoc chain of near-field electromagnetic communications devices. Each device starts in block 302, periodically awakening from a dormant state to listen for a communications carrier. (Either or both of the terminus devices can initiate the formation of a chain by sending a carrier to awaken any other in-range devices.) If no carrier is detected in block 304, the device returns to state 302. When a carrier is detected, the device enters block 306, sending out its own carrier and broadcast requests to inventory all in-range devices. (Due to the nature of near-field communications, this inventorying process is straightforward particularly for devices compliant with IEEE Std 1920.1™) Having awakened, identified and established links with all other in-range devices, each device queries for path quality information to each terminus in block 308. All such devices receiving such queries respond with the path information they have previously compiled in accordance with the description below. The path information compiled by each device identifies each terminus that it is in contact with, and further provides a measure of the path quality to each such terminus. In some implementations, the path quality is simply the number of links between the node and the terminus. In other implementations, the path quality is the minimum-quality link between the node and the terminus (e.g., the lowest data rate, lowest SNR, or highest error rate).

In block 310, the device determines if paths exist to more than one terminus. (There should always be a path to at least one terminus device because the process is initiated by the operation of a terminus device.) If, after having queried all nodes in range, the device finds only paths to the originating terminus, the device sends status information to the originating terminus along the highest quality path in block 312. The status information identifies the device and the best path between the device and the terminus. In some embodiments, the status information further includes all the nodes in range of the device and the quality of links to those nodes. Alternative (e.g., second-best) path information can also be tracked and included in the status information. Such status information enables the terminus device and any intervening nodes to monitor the evolution of the network and, if necessary, send commands to adjust the configuration of downstream links in the network (e.g., to avoid any nodes that appear to be operating erratically).

In block 313 the device monitors status information from downstream devices, which arrives as new nodes are awakened and added to the network. In block 314, the device determines if too much time has passed without the arrival of new status information (indicating that the device is on a branch of the network that can not reach a destination terminus), the process returns to block 302. Otherwise, the device keeps evaluating new status information as it is received, and repeating the operations of blocks 310-314 until a connection is made with a destination terminus. If multiple termini can be reached in block 310, the device evaluates all the available path information in block 316 to determine the upward and downward links from itself in the communications chain. (Direction can be chosen by comparing the terminus identifiers and selecting the smallest identifier as the "top" of the communications chain. The device then enters the communications cycle in block 318, adjusting its timing to synchronize with the upstream node.

In this fashion, the devices establish one or more communications chains between terminus devices in their proximity. The terminus devices are able to collect a complete picture of the network and configure the individual devices to optimize network performance, e.g., by selecting the shortest communications chains, and placing unnecessary nodes in a passive state. If too much time passes without any substantive communications in block 320, the individual devices return to block 306 based on the assumption that a fault has developed in the communications chain.

The foregoing systems and methods offer downhole telemetry networks that are self-establishing without regard to the order in which tubular components are assembled to form a tubular string. The near-field electromagnetic communications devices have a long longevity, enabling them to be installed once and ignored thereafter until needed. Drillers and servicing personnel need not alter their procedures for tripping tubulars in and out of the hole, and the devices can be used on any standard tubular, avoiding any need for obtaining expensive custom tubing. Data rates of 1200-9600 baud are anticipated, though higher data rates are also achievable.

Numerous variations and modifications will become apparent to those skilled in the art once the above disclosure is fully appreciated. For example, the foregoing embodiments have placed an array of devices on a singular tubular, but in some systems the communications chain will include devices on multiple tubulars, e.g., on the casing and on the production tubing. As another example, the uphole terminus device need not be located at the surface. In some embodiments, the uphole terminus device is mounted on the casing and coupled to the surface via a cable or other communications mechanism. In many applications (e.g., distributed sensing applications), the downhole terminus device can be omitted entirely. It is intended that the following claims be interpreted to embrace all such variations and modifications.

What is claimed is:

1. A downhole telemetry system that comprises:
   a tubular for use in a bore hole; and
   an array of near-field electromagnetic communication devices disposed along the tubular, said near-field electromagnetic communication devices relaying information along the tubular bidirectionally,
   wherein said near-field electromagnetic communication devices are adjacent and spaced at least a foot apart,
   wherein a first near-field electromagnetic communication device of the near-field electromagnetic communication devices is attached to an external to the tubular and is protected by an upset of a box end of a tubular joint of the tubular,
   wherein a second near-field electromagnetic communication device of the near-field electromagnetic communication devices is communicative with the first near-field electromagnetic communication device to relay the information bidirectionally using Long Wavelength electromagnetic signals, the second near-field electromagnetic communication device attached to the external of the tubular and protected by an upset of a pin end of the tubular joint of the tubular,
   wherein each of the near-field electromagnetic communication devices comprises a corresponding RuBee device of a plurality RuBee devices, wherein each of the first and the second near-field electromagnetic communication devices comprises the corresponding RuBee device that automatically links to other corresponding RuBee devices in the array of the near-field electromagnetic communication devices, and
   wherein the first and the second near-field electromagnetic communication devices are operable for an expected lifetime of the tubular joint to establish links with other in-range of the near-field electromagnetic communication devices to relay the information bidirectionally.

2. The system of claim 1, wherein the tubular further comprises at least one tubular joint, said at least one tubular joint having at least one of said near-field electromagnetic communication devices permanently attached.

3. The system of claim 2, wherein said at least one of said near-field electromagnetic communication devices is powered by a built-in battery.

4. The system of claim 1, wherein at least one of said near-field communication devices includes an environmental parameter sensor.

5. The system of claim 4, wherein the environmental parameter sensor measures at least one of pressure and temperature.

6. The system of claim 4, wherein the environmental parameter sensor measures at least one of stress, strain, acceleration, resistivity, density, and chemical concentration.

7. The system of claim 1, further comprising an uphole terminus device that converts the information from a near-field electromagnetic communication format to a legacy communication protocol.

8. The system of claim 7, further comprising a downhole terminus device that engages in two-way communication with the uphole terminus device via said array.

9. The system of claim 1, wherein the tubular is drill pipe, well casing, or production tubing.

10. A downhole telemetry system component that comprises:
    a joint of a tubular for connecting to other joints to form a tubular string;
    a plurality of near-field electromagnetic communication devices disposed along the tubular string, said near-field electromagnetic communication devices relaying information along the tubular string bidirectionally, wherein said near-field electromagnetic communication devices are adjacent and spaced at least a foot apart,
    a first near-field electromagnetic communication device of the near-field electromagnetic communication devices is affixed to an external t-e of said joint and protected by an upset of a box end of the joint; and a second near-field electromagnetic communication device of the near-field electromagnetic communication devices is affixed to the external of said joint and protected by an upset of a pin end of the joint, wherein the first and the second near-field electromagnetic communication devices are operable for an expected lifetime of said joint to establish links with other in-range of the near-field electromagnetic communication devices to relay the information along the tubular string bidirectionally, wherein the second near-field electromagnetic communication device is communicative with the first near-field electromagnetic communication device to relay the information bidirectionally using Long Wavelength electromagnetic signals, and wherein each of the near-field electromagnetic communication devices comprises a corresponding RuBee device of a plurality RuBee devices, wherein each of the first and the second near-field electromagnetic communication devices comprises the corresponding RuBee device that automatically links to other corresponding RuBee devices in the near-field electromagnetic communication devices.

11. The component of claim 10, wherein said each of the near-field electromagnetic communication devices is further self-contained and battery powered.

12. The component of claim 11, wherein said each of the near-field electromagnetic communication devices further includes an antenna loop that passes around the joint.

13. The component of claim 10, wherein the first or the second near-field electromagnetic communication device is attached to the external of the joint without structural modification of the joint.

14. The component of claim 13, further comprising at least one sleeve that encloses the first or the second near-field electromagnetic communication device against the external of the joint.

15. The component of claim 10, wherein the first or the second near-field electromagnetic communication device is attached to an internal surface of the joint.

16. A downhole telemetry method that comprises:

assembling a plurality of tubing joints into a string, each tubing joint of the tubing joints having at least one attached RuBee device of a plurality of RuBee devices that automatically links to other RuBee devices of the plurality of RuBee devices in the string, wherein a first RuBee device of the plurality of RuBee devices is attached to an external of corresponding tubing joint of the tubing joints and is protected by an upset of a box end of the corresponding tubing joint, and wherein a second RuBee device of the plurality of RuBee devices is attached to the external of the corresponding tubing joint and is protected by an upset of a pin end of the corresponding tubing joint, wherein the second RuBee device is communicative with the first RuBee device to relay information along the string bidirectionally using Long Wavelength electromagnetic signals; and positioning an uphole terminus device within range of the string to establish bi-directional communications along the string, wherein each of the plurality RuBee devices including the first and the second RuBee devices is operable for an expected lifetime to establish links along the string with each other when in-range to relay the information along the string bidirectionally.

17. The method of claim 16, wherein the tubing joints comprise drill pipe, and the method further comprises including in the string a logging while drilling tool that communicates with the uphole terminus device via a chain of RuBee devices.

18. The method of claim 16, wherein the RuBee devices include temperature or pressure sensors to provide distributed sensing.

19. The method of claim 16, wherein the tubing joints comprise casing and the RuBee devices include sensors to monitor cement characteristics or borehole fluid characteristics.

20. The method of claim 16, wherein the tubing joints comprise production tubing and the RuBee devices include sensors to monitor reservoir characteristics.

* * * * *

UNITED STATES PATENT AND TRADEMARK OFFICE
CERTIFICATE OF CORRECTION

PATENT NO. : 9,715,024 B2  
APPLICATION NO. : 13/387843  
DATED : July 25, 2017  
INVENTOR(S) : Etienne M. Samson and Paul F. Rodney Page 1 of 1

It is certified that error appears in the above-identified patent and that said Letters Patent is hereby corrected as shown below:

In the Specification

In Column 3, Line 59, after "embodiment, the" delete "taphole" and insert --uphole--

In the Claims

In Column 11, Line 1, after "external" delete "t-e"

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*